H. A. STEIERT.
MACHINE FOR HOLDING AND FEEDING BRUSH BACKS.
APPLICATION FILED DEC. 21, 1914.
1,171,473.
Patented Feb. 15, 1916.
5 SHEETS—SHEET 2.
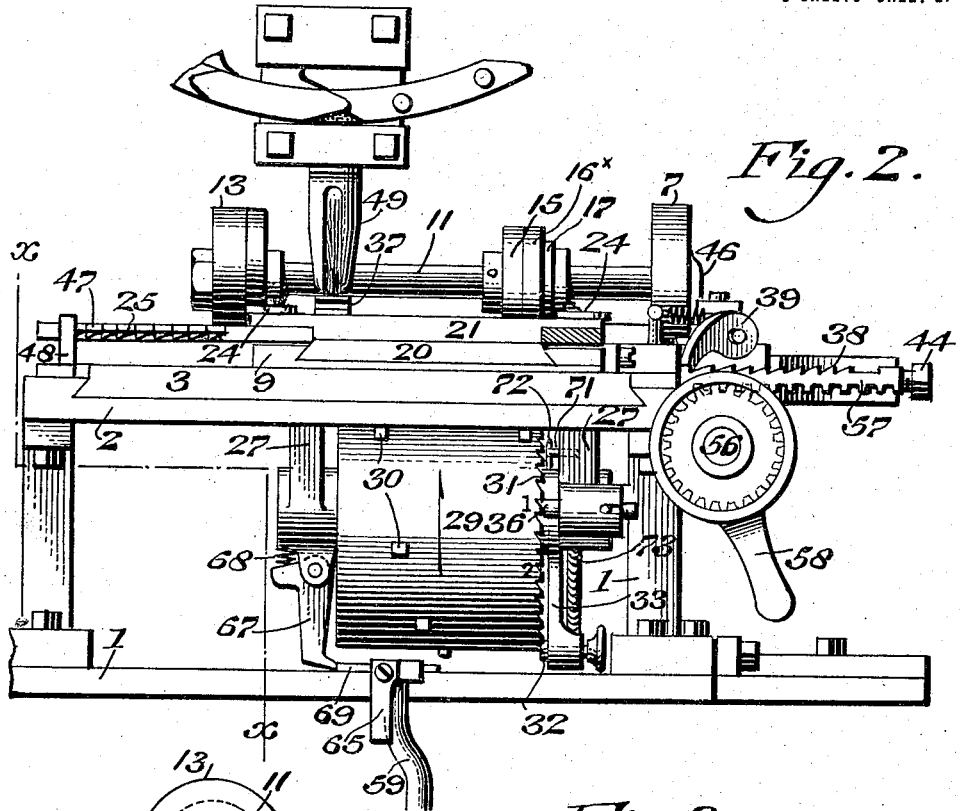
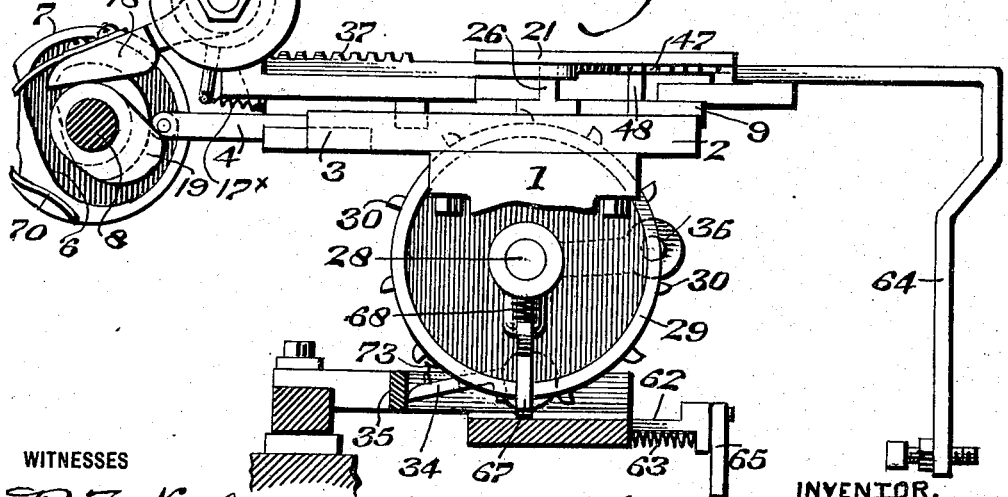

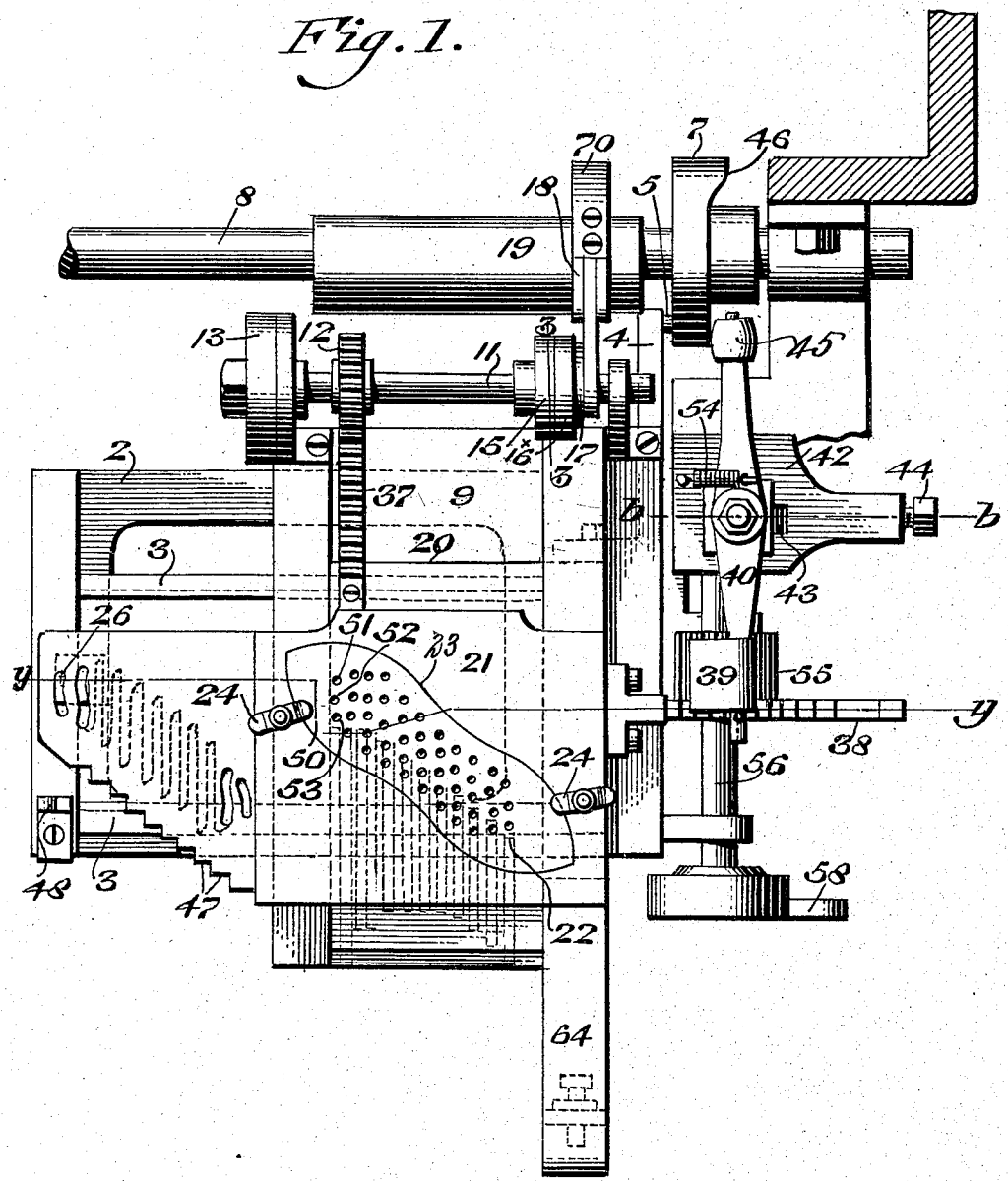

H. A. STEIERT.
MACHINE FOR HOLDING AND FEEDING BRUSH BACKS.
APPLICATION FILED DEC. 21, 1914.
1,171,473.
Patented Feb. 15, 1916.
5 SHEETS—SHEET 3.
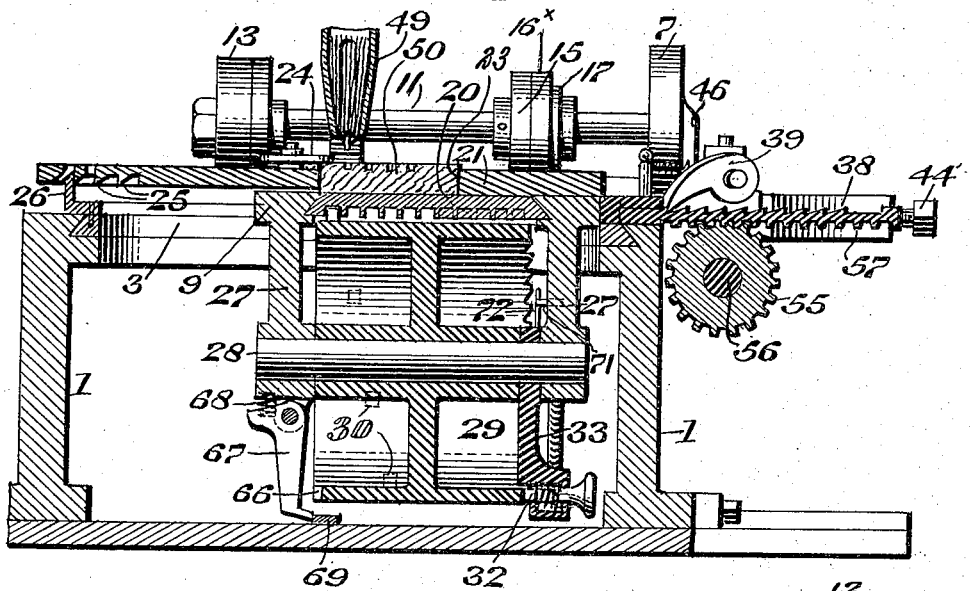
Fig. 4. ON Y—Y FIG. 1.
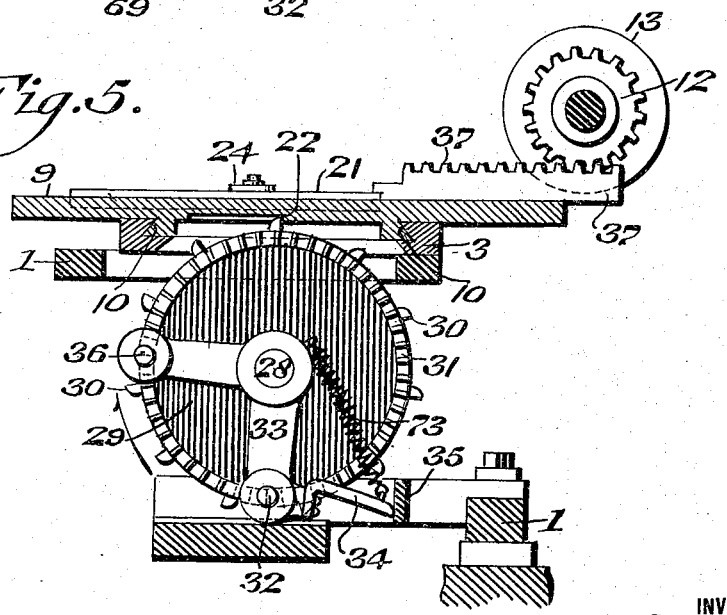
Fig. 5.
WITNESSES
P. F. Nagle
H. G. Dieterich
INVENTOR
Herman A. Steiert.
BY
Wiedersheim & Fairbanks
ATTORNEYS H. A. STEIERT.
MACHINE FOR HOLDING AND FEEDING BRUSH BACKS.
APPLICATION FILED DEC. 21, 1914.
1,171,473.
Patented Feb. 15, 1916.
5 SHEETS—SHEET 4.
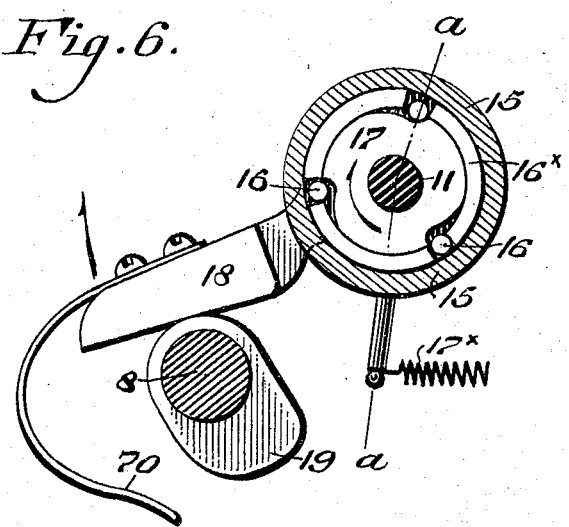
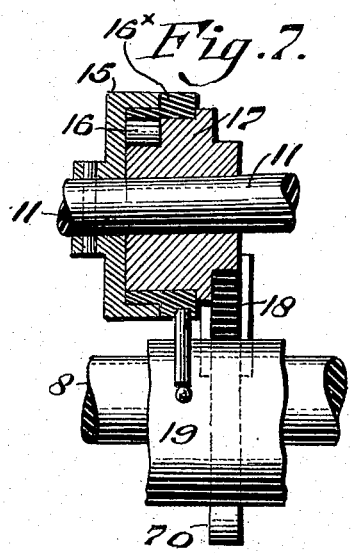
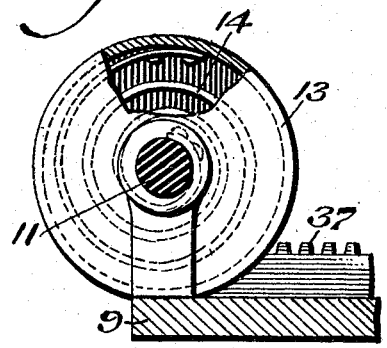
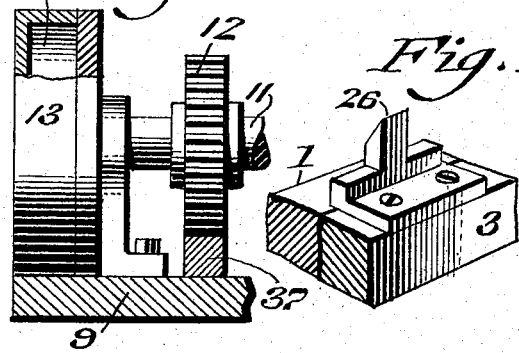
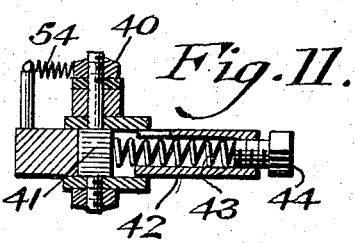
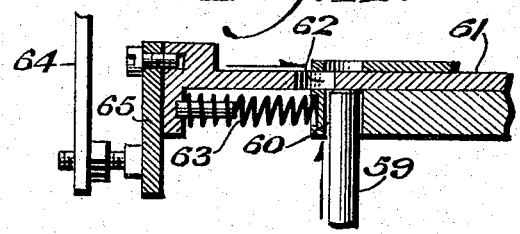
WITNESSES
D. F. Nagle.
H. G. Dieterich
INVENTOR
Herman A. Steiert
BY Wiedersheim & Fairbanks
ATTORNEYS H. A. STEIERT.
MACHINE FOR HOLDING AND FEEDING BRUSH BACKS.
APPLICATION FILED DEC. 21, 1914.
1,171,473.
Patented Feb. 15, 1916.
5 SHEETS—SHEET 5.
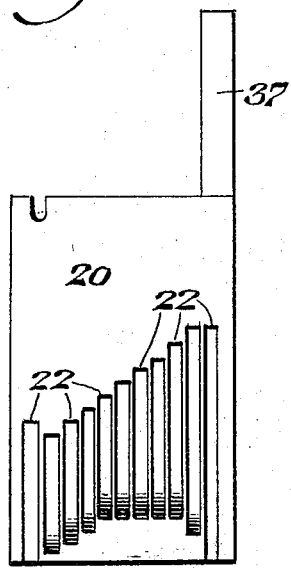
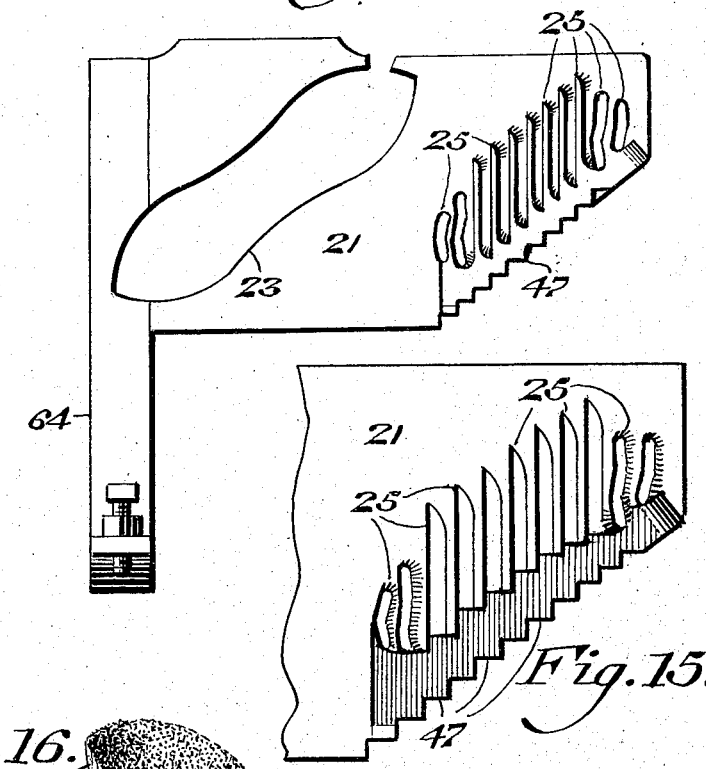
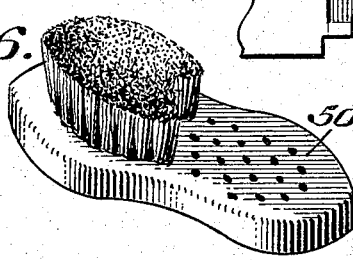

UNITED STATES PATENT OFFICE.

HERMAN A. STEIERT, OF SHARON HILL, PENNSYLVANIA.

MACHINE FOR HOLDING AND FEEDING BRUSH-BACKS.

1,171,473.  Specification of Letters Patent.  Patented Feb. 15, 1916.

Application filed December 21, 1914. Serial No. 878,349.

*To all whom it may concern:*

Be it known that I, HERMAN A. STEIERT, a citizen of the United States, residing at Sharon Hill, county of Delaware, State of Pennsylvania, have invented a new and useful Machine for Holding and Feeding Brush-Backs, of which the following is a specification.

My invention relates to a new and useful machine for holding a brush-back and feeding it to a brush making machine, in order that holes may be bored in the back and the tufts inserted, the back being presented automatically in proper position for this purpose.

It will be understood that the machine is adapted for feeding the brush back to a machine for boring the openings therein or for feeding the brush back to a machine for inserting the bristles into the holes so bored.

It further consists of other novel features of construction, all as will be hereinafter set forth.

For the purpose of illustrating my invention, I have shown in the accompanying drawings, one form thereof which is at present preferred by me, since the same will be found in practice to give satisfactory and reliable results, although it is to be understood that the various instrumentalities of which my invention consists can be variously arranged and organized and that my invention is not limited to the precise arrangement and organization of these instrumentalities as herein shown and described.

Figure 1 is a top plan view of a machine embodying my invention, showing devices for operating the same. Fig. 2 represents an elevation of the machine with a part cut away embodying my invention, showing a portion of a brush filling machine for inserting the bristles in the openings. Fig. 3 is a sectional view on line $x$—$x$ Fig. 2, with certain of the parts broken away and omitted. Fig. 4 is a sectional view on line $y$—$y$ Fig. 1. Fig. 5 is a sectional view of a portion of the device, showing the means for imparting the inward step by step movement with certain parts omitted for the sake of clearness. Fig. 6 is a sectional view on the line $z$—$z$, Fig. 1. Fig. 7 is a sectional view on line $a$—$a$ Fig. 6. Fig. 8 is a partial elevation and partial sectional view, partly broken away, showing the spring means for actuating one of the shafts. Fig. 9 is an elevation of the parts shown in Fig. 8. Fig. 10 is a perspective view of a portion of the device showing the guider employed. Fig. 11 is a sectional view on line $b$—$b$ Fig. 1. Fig. 12 is a sectional view, showing a portion of the means for controlling the stoppage of the machine. Fig. 13 is a bottom plan view of one of the plates employed, forming a part of the brush-back support. Fig. 14 is a bottom plan view of another plate employed, forming a part of the brush-back support. Fig. 15 is a plan view on an enlarged scale showing the extended abutments employed. Fig. 16 represents a perspective view of a brush-back with bristles inserted in some of the openings.

Similar numerals of reference indicate corresponding parts in the figures.

Referring to the drawings: 1 designates the frame of the machine which is formed in any suitable or desired manner and which is adapted to be supported at a suitable point in any desired manner with respect to a brush making machine, which may be of a type either for boring the holes in the brush-back or for inserting bristles in the holes, so bored. It will be understood that the frame suitably supports and carries the various parts hereinafter described, and the parts are so arranged as to operate in the proper sequence and at the proper time to accomplish the desired results.

2 designates a bed frame carried by the frame 1, upon which is movably mounted and guided a movable bed 3 which is adapted to be reciprocated toward and away from the brush machine at proper intervals. In order to accomplish the reciprocation, I have here shown an arm 4 extending from said bed 3 and carrying a roller 5, which is engaged by the cam face 6 of a cam 7 carried on the shaft 8, to which power is suitably applied in any desired manner, and by the rotation of the cam 7, the bed 3 and all of the parts carried thereby will be reciprocated, at predetermined and desired intervals.

9 designates a table or carrier mounted upon said bed 3 for lateral movement thereon and guided for such movement in any suitable or desired manner, as by the dovetailed connection 10. Supported on said table 9 in any suitable or desired manner is a shaft 11, upon which is mounted a pinion 12 and a casing 13, to one end of which is connected a spring 14, the opposite end of which is connected with shaft 11 in such a manner that by the rotation of the shaft 11 in one direction, the spring is wound up, that is, the tension of the spring is increased so that when the shaft is released, the spring returns to its normal position and throws out the brush-back support, as will be described. Also mounted upon the said shaft 11 is the clutch, which is so arranged as to assist in turning the said shaft 11, and as here shown, the clutch is formed of a casing 15 connected with the shaft 11, and within the casing are rollers 16, seated in recesses in a movable ring 16$^x$.

17 designates a cam member having cam faces corresponding in number to the number of rollers. An arm 18 is connected with the cam member 17, so that when the cam booster 19 actuates the arm 18 in the direction indicated by the arrow in Fig. 6, the cam member 17 is moved to cause the cam faces thereof to move the rollers against the casing 15 on the shaft 11 causing a bite, thus imparting a movement to the shaft to assist in the rotation thereof. The ring 16$^x$ is resiliently held by a spring 17$^x$, so that it yieldingly holds the rollers in position to be engaged by the cam faces of the member 17.

The support proper for the brush-back is here shown as formed of two plates 20 and 21, although any suitable arrangement may be employed, said plates being adapted to be suitably secured together. The plates 20 and 21 are in sliding engagement with the carrier or table 9, in order that they may be moved inwardly and outwardly independently thereof, and said plate 20 on its lower face is provided with a plurality of engaging means or shoulders 22 spaced laterally thereon and situated at different points longitudinally in order that the proper step by step inward movement in series may be imparted to the said plates 20 and 21, as will be hereinafter described. The plate 21 is provided with a suitably shaped recess 23 for receiving the brush back, and is provided with locking members 24 adapted to be manually actuated to engage with the brush back to lock the same in position or to release the same. At a suitable point upon the lower face of said plate 21, I provide a series of extended engaging members, shoulders or abutments 25, which, as will be understood from Fig. 14, are suitably spaced apart and the ends of which are in stepped relation to each other in order that the end of each abutment may extend a suitable distance beyond the end of the next adjacent abutment.

26 designates a guider mounted on the bed 3 and positioned to successively engage with the different engaging abutments 25 of the plate 21 and to successively release the same at the proper time, as will be hereinafter described.

Mounted on the table 9 are the hangers 27, which support a shaft 28, on which is secured a drum 29, on the periphery of which are teeth 30 suitably located in order that they are circumferentially and laterally spaced in relation to each other, as will be clearly seen from Figs. 2 and 4, in order that when the drum is rotated, the teeth are caused to successively engage with one of the engaging faces or shoulders 22, and to move the same in order to impart step by step inward movements in series to the brush-back support, each tooth 30 in its turn being moved into and remaining in engagement with its proper shoulder or abutment 22 of the support until by the rotation of the drum 29 the tooth is carried downwardly away from its engagement and so releases the support, as will be understood from Fig. 5. As the teeth 30 are peripherally spaced on the drum 29 and are also spaced laterally thereon, as will be clearly understood from Figs. 2 and 4, the rotation of the drum will cause a tooth to engage with the proper shoulder to impart a series of inward movements to the support and when that tooth has moved away from its engagement the next succeeding tooth will have moved to a position to engage with the next shoulder or abutment at the proper time to impart a series of inward movements to the support, and when this tooth has been moved away the next tooth has been properly located to engage with the next shoulder, which will be apparent.

In order to actuate the drum 29 at the proper time, I have provided a series of teeth or a ratchet 31 in suitable connection with the drum, and with which a pawl 32 is adapted to engage, said pawl being carried by an arm 33 movably mounted on the shaft 28 and with which is connected a lever 34 adapted at each reciprocation of the bed 3 to engage the bar 35, or other suitable point on the frame 1 of the machine, to impart a forward movement to the pawl 32 sufficient to rotate the drum the required distance in the direction indicated by the arrow in Fig. 5, and so advancing or moving the brush-back support step by step inwardly, the required distance, it being understood that the reciprocation of the bed 3 and the actuation of the drum 29 are suitably related and timed in order to impart the proper movement at the proper time to the support for the brush-back.

36 designates a pawl suitably carried by one of the hangers 27 and adapted to engage with the teeth of the ratchet 31 to permit rotation in one direction and to prevent improper return movement of the drum 29. Carried by either of the plates, here shown as the plate 20, is a rack 37 in suitable engagement with the pinion 12, in order to rotate the shaft 11 as the brush-back support is moved inwardly, and when the brush-back support is released by a tooth 30, the spring 14 acts to throw back the support by the action of the pinion 12 on the rack 37. Connected with the table 9 is a ratchet 38, the teeth of which are adapted to be engaged by a pawl 39, which is carried on one end of a lever 40, the said lever being here shown as pivotally mounted upon a movable support 41, the said support being carried in an extension 42 of the frame 1 of the machine. A spring 43 bears against said support, which serves to normally hold the support in normal position and the tension of which spring may be adjusted by the screw member 44. Upon the opposite end of the lever 40 is a roller 45 bearing against an edge of the cam 7, which is provided with a side cam extension or belly 46 adapted at intervals to engage with the roller 45 to actuate the lever 40, it being understood that as long as the guider 26 is in engagement with one of the engaging abutments 25 of the brush-back support, the support is held against lateral or side movement and the pawl 39 cannot move the ratchet 38. In this event, the actuation of the roller end of the lever 40 by the cam extension 46 will force the pawl 39 against one of the teeth of the ratchet 38, but as this cannot move, the action will be to force the support 41 outwardly against the tension of the spring 43, the pawl 39 serving as the fulcrum of the lever 40 at that time. When, however, by the inward movement of the brush-back support, the end of the engaging member 25 with which the guider 26 is in engagement has been reached, the bed 9 is no longer held thereby, and the side extension 46 is timed to impart an outward movement of the roller end of the lever 40 which moves inwardly the other end of the said lever 40 and the pawl 39 carried thereby, which is in engagement with a tooth of the ratchet 38 will force over the plates 20 and 21 with the table 9 and move the same laterally or sidewise, while at substantially this time, the tooth 30 of the drum 29, which has been in engagement with one of the engaging shoulders 22, will have released the same and the spring 14 will at once act to throw outwardly the plates 20 and 21, so that the lateral side movement and outward throw of these plates forming the support of the brush-back are suitably accomplished and timed. In order to locate these plates or brush-back support after each side and outward movement in proper position for the next series of step by step inward movements, I have provided a series of stepped shoulders 47 on one of the plates, here shown as the plate 21, and I have mounted a stop 48 on the frame 1, and the side movement and outward throw will cause the proper shoulder 47 to successively engage the stop 48, as will be evident and these parts will thus limit both the side and outward movements.

It will be understood that the means for imparting the inward series of step by step movements, here shown as a drum and coacting devices, is arranged in order that the support for the brush-back will be moved inwardly step by step and with suitable dwells in order that the series of holes may be drilled, or, in order that the bristles may be inserted in the said holes, depending upon with which character of machine the device is being used.

I have shown a spring 54 connected with the lever 40 for holding the same in and returning the same to proper position, and I have also shown a pinion or gear 55 mounted on a shaft 56, said pinion 55 being in engagement with the teeth 57 on the ratchet 38, while on said shaft 56 is mounted a hand lever 58, so that when it is desired, when the machine is not running, the lateral movement may be made by hand. In order to positively stop the machine at the proper time, I have provided a rod 59, one end of which is connected with a pedal not shown controlling the clutch not shown for starting and stopping the machine, the opposite end of which rod is movable in an opening 60 in the frame 1. A slide plate 61 is movably mounted on the frame 1 having an opening 62 therein and a spring 63 normally holds said opening 62 out of alinement with the opening 60 in the frame 1, so that when the machine is in operation, the rod 59 abuts the slide 61 and is held in its lowermost position holding the pedal in starting and operating position.

64 designates an arm carried by the brush-back support and which moves inwardly therewith, and is so positioned that at the proper time, it engages with a latch 65 carried on the plate 61 and forces the same inwardly against the tension of the spring 63, and thus moves the opening 62 into alinement with the opening 60, whereupon the pedal will force the rod 59 upwardly and the machine will be automatically stopped.

In order to lock the drum 29 when the machine is stopped to prevent the further rotation of the said drum, I provide a notch 66 therein, and I have provided a dog 67, which normally bears against the edge of the drum, due to the spring 68, until the notch 66 is reached, when the spring 68 forces the dog 67 into said notch and so locks the drum against rotation. When the bed 3 is moved to starting position, the dog 67 engages a stationary member 69 on the frame 1, which is so positioned as to remove the dog 67 from the notch 66, see Fig. 4, and the parts are ready for operation again.

The arm 18 is here shown as provided with a spring member 70, which is so located that it will be struck by the cam booster 19 if the arm 18 for any reason should not return to its proper position. In order to limit the rearward movement of the arm carrying the pawl 32, I have provided a stop 71 on one of the hangers, which is engaged by a pin 72 carried by the arm 33, so that the latter, when returned to position by the spring 73, will always be located in proper position, ready for the next operation.

As I have illustrated in the drawings a portion of a machine for inserting the bristles, the operation of the device will be described with respect thereto. It will be understood that the device, as previously stated, can be used for feeding brush backs for boring the openings or holes therein, for inserting the bristles into the holes so bored, or both. As above stated, in the present instance, I have shown a portion of a bristle inserting machine which forms no part of the present invention but in which it will be understood that the bristles are properly fed to the nozzle 49 and therefrom into the holes of the brush back at the proper time, and which operation is suitably timed with respect to the operation of the feeding machine. The brush back 50 in which the holes have already been drilled, having been inserted and locked in position upon the support 21, and the parts being in the position seen in Fig. 1, it will be understood that the machine is ready for operation with the first line of holes in suitable positoin to be located beneath the nozzle 49 with the first tooth 30 of the drum 29 in engagement with the first of the series of abutments 22 on the plate 21. The machine having now been started, suitable motion will be imparted to the shaft 8 as well as to the brush making machine. The latter will be operated to cause the bristles which have fed to the nozzle 49 to be inserted in the first hole 51 which is beneath the nozzle. The cam 7 will be suitably rotated to impart a reciprocating movement to the support 21, which will remove the ends of the bristles from the nozzle and will cause the lever 34 to be moved to a position to engage with the bar 35. This will cause an actuation of the pawl 32 carried by the lever 34 to rotate the drum one step inwardly, while at the same time, the rotation of the cam booster 19 will cause it to lift the rod 18, causing the clutch to engage and assist in the rotation of the shaft 11 in the same direction of rotation as that imparted thereto by the inward movement of the rack 37 carried by the support and which is in engagement with the gear 12 on the said shaft. This inward movement will locate the second opening 52 beneath the nozzle, and the brush making machine will again insert a bunch of bristles into the second opening, whereupon the cam 7 again reciprocates the support 21, again causing the lever 34 to engage with the bar 35 to impart a suitable amount of rotation to the drum 29 to again move the support inwardly another step thus locating the opening 53 beneath the nozzle 49, while at the same time, imparting further rotation to the shaft 11, it being understood that by each of such rotations of the shaft 11, the tension of the spring 14 is increased. The brush making machine will again be operated to insert a bunch of bristles in the said third opening 53, whereupon the cam 7 will again reciprocate the support 21. This reciprocation will remove the guider 26 from its engagement with the first abutment 25 on the support 21 and the drum 29 will have been rotated sufficiently to move the first tooth 30 away from its engagement with the first shoulder 22. As the guider is no longer in engagement with an abutment 25, there is nothing to prevent the lateral or side movement of the support and the cam extension 46 on the cam 7 is so timed that it will at this time engage with one end of the lever 40 to move the same in the proper direction, which will cause movement of the other end of the lever 40 in the opposite direction, and as the pawl 39 is in engagement with the tooth of the rack 38, it will move the support 21 laterally. At the same time, as above stated, as the first tooth 30 is no longer in engagement with the first shoulder 22, the spring 14 will throw the support outwardly in the opposite direction from its inward movement, and these two movements outwardly and sidewise, or laterally, will throw the support so that the first notch or shoulder 47 on the support is thrown into engagement with the stop 48 and the support and the various parts are thus located in position. in order that the guider 26 will have been brought into proper engagement with the second of the engaging abutments 25 and the next or second tooth 30 on the drum 39 is in engagement with the next adjacent engaging shoulder 22, while the first hole of the second row of holes will be located beneath the nozzle 49. When the said extension 46 of the cam 7 releases the end of the lever 40, the springs connected therewith will move the pawl end thereof in order to cause the said pawl 39 to be in engagement with the next succeeding tooth on the rack 38 and ready for the next side or lateral throw. The same cycle of operations just described will take place until the second series of holes have been filled or receive bristles, when the support is again moved sidewise and outwardly to cause the second shoulder 47 to engage with the stop 48, so that the guider 26 is in engagement with the next or third engaging abutment 25, while the next or third tooth 30 of the drum 39 is in engagement with the next or third shoulder 22 and the first hole of the third series of holes is in position to receive the bristles. These operatitons are repeated until all of the holes in the back have received the bristles, at which time, the arm 64 carried by the support, will have engaged with the latch 65 carried on the plate 61 and forces the same inwardly to locate the opening 62 in the plate 61 in line with the opening 60, whereupon the rod 59 moves upwardly and passes through the opening 62 and this movement of the rod releases the pedal controlling the clutch and the machine is stopped. At this time, it will be understood that the rotation of the drum 29 has been such that the notch 66 in the drum will be in line with the dog 67 which heretofore was in engagement with the side edge of the drum, and the dog 67 is forced thereinto by the spring 68, so that the drum is thus locked against rotation.

It will be understood that the support 21 is now in its extreme left hand position with the last shoulder 47 in engagement with the stop 48, and the handle 58 in engagement with the pinion 55 will have been moved substantially 90°. In order to now return the parts to their starting position, the operator presses inwardly upon the support 21, and at the same time, by grasping the handle 58 and rotating the same, to return it to the position seen in Fig. 2, will cause the support 21 to be moved laterally to the right in said figure by reason of the engagement of the teeth of the pinion 55 with the rack 57. This action will return the support 21 to its initial position, as seen in Fig. 1, and at the same time, by releasing the support 21, the spring 14 will throw it outwardly until the first tooth 30 will have engaged with the first shoulder 22 on the support, it being understood that this first tooth 30 has been moved to its proper position for such engagement by the previous rotation of the drum. At this time, the guider 26 will again be in engagement with the first engaging abutment 25 and the parts ready for the next operation. By the return side and outward movement of the support 21, the dog 67 will be caused to engage with the stationary member 69 on the frame 1 to remove the same from its engagement with the walls of the notch 66 so that the drum may be rotated at the proper time. When it is desired to start the machine the operator depresses the controlling pedal and the rod 59 is lowered, removing it from the opening 62, immediately upon which the spring 63 throws the plate 61 in the opposite direction, locating the solid portion of the plate 61 over the top of the rod 59 and is thus held in position in order that the machine will operate continuously until the arm 64 again contacts with the latch 65. The same cycle of operations is then repeated, as above described. The completed brush can be removed at any time, as for example, after the support 21 has been moved to its initial position and a brush back to be filled can then be inserted.

From the above it will be understood that the brush-back support is moved inwardly step by step in series, is released at the proper time in order to be moved laterally and thrown outwardly to locate the same in position in order that the next succeeding series of holes are moved step by step into position beneath the nozzle, and this action is repeated as many times as there are holes and series of holes, which may vary, depending upon the character and size of the brush desired to be made, as well as depending upon the arrangement of the holes. The first two and last two engaging abutments 25 in the drawing, are shown curved because of the particular construction of brush which is shown, in which the end holes are not quite in line, as will be seen, although this may be varied, depending upon the character of the brush. It will be noted that the brush back is situated angularly in the support, by reason of which the back may be properly presented in a convenient and easy manner to accomplish the desired result.

As described with respect to the bristle insertion, it will be understood that in boring the holes the brush back is fed inwardly in serial step by step movements and is moved laterally at the end of each series to locate the back properly beneath a boring tool, the operating of the parts providing for the proper movements and dwells and being timed with respect to the operation of the boring tool.

It will now be apparent that I have devised a novel and useful machine for holding and feeding brush backs which embodies the features of advantage enumerated as desirable in the statement of the invention and the above description, and while I have, in the present instance, shown and described a preferred embodiment thereof which will be found in practice to give satisfactory and reliable results, it is to be understood that the same is susceptible of modification in various particulars without departing from the spirit or scope of the invention or sacrificing any of its advantages.

Having thus described my invention, what I claim as new and desire to secure by Letters Patent, is:—

1. In a device of the character stated, a support for the brush-back, means for imparting a reciprocating forward and backward movement thereto, means for imparting series of spaced step by step inward movements to said support, means for imparting a side movement thereto at the end of each series of inward movements, means for throwing said support outwardly at the end of each series of inward movements and means with which the support engages to limit its outward and lateral throws for initially locating said support in proper position for each series of inward movements.

2. In a device of the character stated, a support for the brush-back, means for imparting series of step by step inward movements to the support for a predetermined time and releasing the same at the end of each series, means for guiding the inward movement of the support and releasing the same at the end of each series, means for moving the support laterally when released at the end of each series of inward movements, means for throwing the support outwardly when released at the end of each series of inward movements and means for engagement with the support to limit outward movements and the side throws to locate the support in position for each series of inward step by step movements.

3. In a device of the character stated, a support for the brush-back, means for imparting a reciprocating forward and backward movement thereto, means each adapted in succession to impart series of step by step movements inwardly to the support at predetermined times, and releasing the same at the end of each series of inward movements, means for guiding the support for each series of step by step movements and releasing the same at the end of each series of inward movements, means for moving the support laterally when released, means for throwing the support outwardly at the termination of a series and means for engagement with the support for limiting the lateral and the outward throw of the support to locate it in position for the next inward series of movements.

4. In a device of the character stated, a support for the brush-back, a carrier having a plurality of laterally and longitudinally spaced teeth adapted for serial engagement with the support, means for actuating the carrier to cause the teeth in turn to engage the support and to impart series of step by step movements inwardly to the support at predetermined times and to release the support at the end of each series, means for guiding the support in its step by step movement and releasing the same at predetermined times, means for moving said support laterally when released, means for throwing the support outwardly at the termination of a series, and means for limiting the lateral movement and outward throw of the support to locate it in position for the next series of inward movements.

5. In a device of the character stated, a frame, a support for the brush-back movable on the frame, means suitably spaced apart for imparting series of step by step movements inwardly to the support at predetermined times and releasing it at the end of each series, a series of stepped tracks and a guide member common to the support and the frame of the machine and adapted for engagement for guiding the support for each series of step by step movements and releasing it at the end of each series, means for moving the support laterally when released, means for throwing the support outwardly at the termination of a series, and means for limiting the lateral movements and outward throws of the support to locate it in position for the next inward series of movements.

6. In a device of the character stated, a support for the brush-back, a drum having a plurality of laterally and circumferentially spaced teeth adapted for successive engagement with the support, a pawl and ratchet mechanism for the drum adapted to be actuated to rotate said drum to impart series of step by step movements inwardly to the support at predetermined times and to release the support at the end of each series, means for preventing improper return movement of the support, means for guiding the support in its step by step movements and releasing it at predetermined times, means for moving the support laterally when released, means for automatically throwing the support outwardly at the termination of a series of inward movements, and means for limiting the lateral movements and outward throw of the support to locate it in position for the next series of inward movements.

7. In a device of the character stated, a support for the brush-back, a plurality of shoulders located at suitable positions thereon, a drum having a plurality of laterally and circumferentially spaced teeth, each of which is adapted at the proper time to engage one of said shoulders, means for rotating said drum to cause the teeth in turn to engage a proper shoulder and to impart serial step by step movements inwardly to said support and to release it at predetermined times, means for guiding the support in its step by step movements and releasing it at predetemined times, means for moving the support laterally when released, means for throwing the support outwardly at the termination of a series of inward movements, and means for limiting the lateral movements and the outward throw of the support to locate it in position for the next series of inward movements.

8. In a device of the character stated, a support for the brush-back, means suitably spaced apart and adapted to be actuated to engage the support in succession to impart series of step by step movements inwardly thereto at predetermined times and releasing the support at the end of each series, a guider adapted for engagement with the support to guide and hold it against lateral movement during each series of inward movements, and adapted to release it at the termination of each series of inward movements, means engaging the support and adapted to be actuated for moving the support laterally when released from the guider, means for throwing the support outwardly at the termination of each series of inward movements, and means for limiting the lateral movements and the outward throws of the support to locate it in position for the next series of inward movements.

9. In a device of the character stated, a support for a brush-back, means suitably spaced apart and adapted to be actuated to engage the support in succession to impart series of step by step movements inwardly thereto at predetermined times and releasing the support at the end of each series of inward movements, means for actuating the engaging means, a series of abutments in suitable stepped relation carried by the support, a guider adapted for engagement successively with each of said abutments for guding and holding the support against lateral movement during each series of step by step inward movements and releasing the support at the end of each series of inward movements, means in engagement with the support for holding the abutments and guider in suitable engagement, and adapted, when the guider is released, to move the support laterally, means for throwing the support outwardly at the termination of each series of inward movements, and means for limiting the side movement and outward throw of the support to locate it in position for the next series of inward movements.

10. In a device of the character stated, a support for the brush-back, means suitably spaced apart and adapted to be actuated to engage the support in succession to impart series of step by step movements inwardly thereto at predetermined times, and releasing the support at the end of each series of inward movements, means for actuating the engaging means, a series of abutments in stepped relation, a guider adapted for engagement successively with each of the abutments for guiding and holding the support against lateral movement during each series of step by step inward movements and releasing the support at the end of each series, means in engagement with the support for holding the abutment and guider in suitable engagement and adapted, when the guider is released, to move the support laterally, a spring in suitable connection with the support and adapted to have its tension increased by the inward step by step movement of the support and adapted, when the support is released, at the termination of each series, to throw the support outwardly, and means for limiting the lateral movement and outward throw of the support to locate it in position for the next series of inward movements.

11. In a device of the character stated, a support for the brush-back, means suitably spaced apart and adapted to be actuated to engage the support in succession to impart series of step by step movements inwardly thereto at predetermined times and releasing the support at the end of each series, means for actuating the engaging means, a series of stepped abutments in suitable spaced relation, a guider adapted for engagement successively with each of the abutments for guiding and holding the support against lateral movement during each series of step by step inward movements and releasing the support at the end of each series, means in engagement with the support for holding the abutment and guider in suitable engagement and adapted, when the guider is released, to move the support laterally, a spring in suitable connection with the support and adapted to have its tension increased by the inward step by step movements of the support and adapted, when the support is released, at the termination of each series, to throw the support outwardly, means adapted to be actuated at the inward movements of the support to assist the movements for increasing the tension of said spring, and means for limiting the lateral movement and outward throw of the support to locate it in position for the next series of inward movements.

12. In a device of the character stated, a support for the brush-back, a plurality of shoulders located at suitable spaced positions thereon, a drum having a plurality of latally and circumferentially spaced teeth, each of which is adapted at the proper time to engage one of said shoulders, means for rotating said drum to impart serial step by step movements inwardly to said support and to release it at predetermined times, a plurality of stepped abutments located at suitable positions on said support, a guider adapted to successively engage the said abutments for guiding the support in its step by step movements and releasing it at the end of each series, means for moving the support laterally when released by said guider, means for throwing the support outwardly when released by each of said teeth, and means for limiting the lateral movement and the outward throw of the support to locate it in position for the next series of inward movements.

13. In a device of the character stated, a support for the brush-back, a plurality of shoulders located at suitable spaced positions thereon, a drum having a plurality of laterally and circumferentially spaced teeth, each of which is adapted at the proper time to engage one of said shoulders, means for rotating the said drum to impart serial step by step movements to said support and to release it at predetermined times, a plurality of stepped abutments located at suitable positions on the said support, a guider adapted to successively engage the said abutments for guiding the support in its step by step movements and releasing it at the end of each series, a pawl mechanism in engagement with said support, means for actuating said mechanism for moving the support laterally when released by said guider, means for throwing the support outwardly when released by each of said teeth, and means for limiting the lateral movement and the outward throw of the support to locate it in position for the next series of inward movements.

14. In a device of the character stated, a support for the brush-back, a plurality of shoulders located at suitable spaced positions thereon, a drum having a plurality of laterally and circumferentially spaced teeth, each of which is adapted at the proper time to engage one of said shoulders, means for rotating the said drum to impart serial step by step movements to said support and to release it at predetermined times, a plurality of abutments located at suitable positions on the said support, a guider adapted to successively engage the said abutments for guiding the support in its step by step movements and releasing it at the end of each series, a pawl mechanism in engagement with said support, means for actuating said mechanism for moving the support laterally when released by said guider, a spring in suitable connection with said support for throwing the support outwardly when released by each of said teeth, and means for limiting the lateral movement and the outward throw of the support to locate it in position for the next series of inward movements.

15. In a device of the character stated, a support for the brush-back, a plurality of shoulders located at suitable spaced positions thereon, a drum having a plurality of laterally and circumferentially spaced teeth, each of which is adapted at the proper time to engage one of said shoulders, means for rotating the said drum to impart serial step by step movements to said support and to release it at predetermined times, a plurality of stepped abutments located at suitable positions on the said support, a guider adapted to successively engage the said abutments for guiding the support in its step by step movements and releasing it at the end of each series, a pawl mechanism in engagement with said support, means for actuating said mechanism for moving the support laterally when released by said guider, means for throwing the support outwardly when released by each of said teeth, a plurality of stepped shoulders on said support and a stop with which the said stepped shoulders successively engage after each series of inward movements for limiting the lateral movement and the outward throw of the support to locate it in position for the next series of inward movements.

HERMAN A. STEIERT.

Witness:
C. D. McVay.

Copies of this patent may be obtained for five cents each, by addressing the "Commissioner of Patents, Washington, D. C."